(12) United States Patent
Fedorovich

(10) Patent No.: US 8,846,220 B2
(45) Date of Patent: Sep. 30, 2014

(54) MICROBIAL FUEL CELL CATHODE ASSEMBLY

(75) Inventor: Vyacheslav Viktorovich Fedorovich, Edinburgh (GB)

(73) Assignee: Power Knowledge Limited, Edinburgh (GB)

( * ) Notice: Subject to any disclaimer, the term of this patent is extended or adjusted under 35 U.S.C. 154(b) by 858 days.

(21) Appl. No.: 12/738,547

(22) PCT Filed: Oct. 16, 2008

(86) PCT No.: PCT/GB2008/050946
§ 371 (c)(1),
(2), (4) Date: Jul. 7, 2010

(87) PCT Pub. No.: WO2009/050513
PCT Pub. Date: Apr. 23, 2009

(65) Prior Publication Data
US 2010/0297477 A1    Nov. 25, 2010

(30) Foreign Application Priority Data

Oct. 16, 2007 (GB) .................................. 0720203.9

(51) Int. Cl.
*H01M 8/16* (2006.01)
*H01M 8/04* (2006.01)

(52) U.S. Cl.
CPC ............ *H04M 8/16* (2013.01); *H01M 8/04082* (2013.01); *H01M 8/04186* (2013.01); *H01M 8/04201* (2013.01); *H01M 8/04216* (2013.01)
USPC ............... 429/2; 429/401; 429/512; 429/513; 429/515

(58) Field of Classification Search
USPC .............................. 429/2, 401, 512, 513, 515
See application file for complete search history.

(56) References Cited

U.S. PATENT DOCUMENTS

| | | | |
|---|---|---|---|
| 7,147,955 B2 * | 12/2006 | Adams | 429/443 |
| 7,687,161 B2 * | 3/2010 | Karamanev | 429/2 |
| 2004/0241771 A1 * | 12/2004 | Zeikus et al. | 435/7.32 |

(Continued)

FOREIGN PATENT DOCUMENTS

| | | |
|---|---|---|
| EP | 1 742 288 | 1/2007 |
| WO | WO 2006/072112 | 7/2006 |

OTHER PUBLICATIONS

International Search Report for PCT/GB2008/050946, mailed Apr. 17, 2009.

(Continued)

*Primary Examiner* — Jeremiah Smith
(74) *Attorney, Agent, or Firm* — Nixon & Vanderhye PC

(57) ABSTRACT

Disclosed is a microbial fuel cell cathode assembly comprising a catalyst (6) and an electrically conductive catholyte wicking member (5) having a catalyst contacting surface (5a) in contact with the catalyst, an electrical contact region (5c) for contacting an electrical connector, and a catholyte supply region (5b) for receiving catholyte from a catholyte supply (9), wherein the electrically conductive catholyte wicking member is operable to wick received catholyte from the catholyte supply region to form a film of catholyte on a part of the surface of the catalyst such that a part of the surface of the catalyst is in contact with both the film of catholyte and a part of the surface of the catalyst is in contact with a gas pathway arranged to supply oxygen to the catalyst.

18 Claims, 5 Drawing Sheets

(56) References Cited

U.S. PATENT DOCUMENTS

| | | | |
|---|---|---|---|
| 2005/0208343 A1 | 9/2005 | Kim et al. | |
| 2006/0046123 A1* | 3/2006 | Guo et al. | 429/34 |
| 2007/0072038 A1* | 3/2007 | Kamo et al. | 429/34 |
| 2007/0131547 A1* | 6/2007 | Nomoto et al. | 204/403.01 |
| 2007/0134520 A1* | 6/2007 | Shimomura et al. | 429/2 |
| 2007/0134525 A1* | 6/2007 | Yamamoto et al. | 429/19 |
| 2007/0259217 A1* | 11/2007 | Logan | 429/2 |
| 2007/0274872 A1* | 11/2007 | Makita et al. | 422/105 |
| 2008/0220292 A1 | 9/2008 | Rabaey | |
| 2009/0029198 A1* | 1/2009 | Jin et al. | 429/13 |

OTHER PUBLICATIONS

Rabaey and AL K:, "Tubular Microbial Fuel Cells for Efficient Electricity Generation", Environmental Science and Technology, American Chemical Society, Easton, PA, US, vol. 39, No. 20, Sep. 20, 2005, pp. 8077-8082, XP002428053.

Zhao et al., "Application of pyrolysed iron(II) phthalocyanine and CoTMPP based oxygen reduction catalysts as cathode materials in microbial fuel cells", Electrochemistry Communications vol. 7, 2005, pp. 1405-1410.

Park et al., "Improved Fuel Cell and Electrode Designs for Producing Electricity from Microbial Degradation", Biotechnology and Bioengineering, vol. 81, No. 3, Feb., 2003, pp. 348-355.

Cheng, et al., "Increased performance of single-chamber microbial fuel cells using an improved cathode structure", Electrochemistry Communications, vol. 8, 2006, pp. 489-494.

Rabaey & Verstraete "Microbial fuel cells: Novel biotechnology for energy generation" Trends in Biotechnol. 23:291-298 (Jun 2005).

* cited by examiner

MICROBIAL FUEL CELL CATHODE ASSEMBLY

This application is the U.S. National Phase of International Application No. PCT/GB2008/050946, filed 16 Oct. 2008, which designated the U.S. and claims priority to Great Britain Application No. 0720203.9, filed 16 Oct. 2007, the entire contents of each of which are hereby incorporated by reference.

FIELD OF THE INVENTION

The present invention relates to cathode assemblies for microbial fuel cells.

BACKGROUND TO THE INVENTION

Anaerobic micoorganisms generate reducing equivalents such as quinones, NADH etc. during oxidative metabolic processes, for example glycolysis. These reducing equivalents can transfer electrons to conductive materials, such as an anode, and thereby change the redox state of the conductive material. This phenomenon allows the accumulation of negative electric charge from microbial processes at a collector. Several processes based on oxygen reduction are known which lead to the accumulation of positive electric charge on another conductive material, such as a cathode. By closing a circuit between the conductive materials, an electric current can be generated. This basic idea is realised, more or less successfully, in various types of devices called microbial fuel cells.

Cathode assemblies for microbial fuel cells usually differ from cathode assemblies for chemical fuel cells. A major constraint which affects the design of microbial fuel cell cathode assemblies follows from the requirement for the cathodes to function alongside biological processes located in an anodic zone, while minimising or obviating chemical effects upon bacterial cells. Due to this restriction, the reaction which takes place at the cathode of microbial fuel cells is typically based on the reduction of oxygen from air. This is commercially attractive because oxygen is freely available in air.

Nevertheless, in some cathode assemblies, power consumption is required to supply oxygen to the catalyst. For example, in so-called immersed cathode systems where the catalyst is wholly immersed in catholyte meaning that oxygen must diffuse through the catholyte, energy is typically consumed to pump oxygen to the immersed cathode or to pump oxygen saturated catholyte across the surface of the cathode. The power consumption of these pumping mechanisms can exceed the power output of the bacteria in the anodic zone.

An alternative known type of cathode is a so-called "air facing cathode" (also referred to as a "dry cathode") which is in the form of an electrolyte-permeable sheet having a first surface in contact with the aqueous electrolyte of the cell and an opposed second surface which is exposed to atmospheric air. As oxygen does not need to diffuse through the catholyte, the mass transport of oxygen is less of a limiting factor than for an immersed cathode. However, water accumulates in the electrolyte-permeable sheet both from the aqueous catholyte and the formation of water as a result of the reduction of oxygen. Some of the water evaporates, but no water forms on the surface of the electrolyte-permeable sheet. Solid salts typically precipitate within the electrolyte-permeable sheets, due to ion exchange between the anodic and cathodic zones, blocking the cathode during long term use in open circuit mode.

Several approaches have been proposed to improve these known cathode assemblies.

US 2005/208343 (Korea Institute of Science and Technology) discloses a membrane-less microbial fuel cell comprising a simple air cathode. The air cathode is located near the top of a cylindrical anaerobic reactor (containing an anode) which is adapted such that the distance between the anode and the cathode may be varied. Waste water, which contains organic species, is fed through an inlet at the bottom of the reactor from where it passes upwards. Cleaned effluent exits the reactor from the top of the uppermost chamber.

This arrangement has several advantages. The distance between the anode and the cathode affects electric current generation, therefore this type of cathodic arrangement provides a variable performance microbial fuel cell. This design of microbial fuel cell can readily be scaled up. Also, no special cathodic electrolyte is required as treated waste water exits from the anodic zone and passes upwards into the cathodic zone, where it is used as cathodic electrolyte. Nevertheless, the efficiency of the air cathode is very low because the absence of a membrane between the anodic and cathodic zones which leads to a loss of oxygen and positive electric charges, due to the reduction in the cathodic zone by means of reducing equivalents, which were produced by microbes in the anodic zone.

WO 2006/072112 (Washington University) discloses a mediator-less fuel cell in which the cathodes take the form of U-shape conductive tubes. The outside surface of a cathodic tube includes an ion-exchange membrane. Cathodic potential is generated by feeding potassium ferricyanide through the cathodic tube. The cathodic tubes functions as collectors of positive charge and the interior of the tube is filled with granules of activated carbon, which are used as anodic electrodes. This arrangement of cathodic tubes improves cathode performance due to the increased total surface area of the composite electrode. However, the net energy balance of microbial fuel cells which use ferricyanides is negative. Moreover, ferricyanides may work effectively in alkaline electrolytes, but during long term experiments, in current generation mode, the pH of the cathodic zone slowly drops down due to the proton flux from the anodic zone.

Zhao et al., (In Electrochemistry Communications, Vol. 7 (2005), p. 1405) tested immersed graphite cathodes where metallo-organic catalysts such as iron and cobalt phthalocyanines and cobalt tetramethoxyphenylporphyrine (CoTMPP) were used as platinum substitutes. It was found that phthalocyanines can give almost the same current densities as platinum but have the advantage that they are cheaper. However, like all immersed cathodes, they have a problem with mass transport of oxygen to the electrode and they accumulate hydrogen peroxide during long term work in current generation mode. The attempt to increase mass transport by intensifying the mixing conditions increase the energy consumption associated with aeration.

Park and Zeikus (Biotechnology and Bioengineering, Vol. 81 (2003), p. 348) have proposed an improved air cathode based on the reaction: $O_2 + 4H^+ + 4e^- \leftrightarrow 2H_2O$, in which iron ions serve as the catalyst. The electrode comprises a kaolin matrix containing dispersed iron. In such electrodes, the process of water evaporation from the electrode surface would be expected to compete with the process of water accumulation in the porous electrode system. This phenomenon could take place when the current is low, and this imbalance reduces the efficiency of the cathode.

S. Cheng et al., (Electrochemistry Communications, Vol. 8 (2006), p. 489) disclosed an improved on air cathode based on the reaction: $O_2 + 4H^+ + 4e^- \leftrightarrow 2H_2O$, which included a carbon cloth electrode coated on the air-facing side with a mixture of polytetrafluoroethylene (PTFE) and carbon powder to prevent water losses. A platinum catalyst was applied to the water-facing side using Nafion as a binder. (Nafion is a trade mark) However, due to the use of a proton permeable Nafion membrane, it was not possible to obtain good current densities, for example, more 1 mA/cm$^2$ at cathodic potential equal to +200 mv relative to a standard hydrogen electrode because the pH of the biological anodic zone was in the range of 5.0-5.5. Moreover, at high current densities the proton concentration limits the rate of the cathodic reaction. Furthermore, the use of platinum as cathodic catalyst is commercially unattractive, due to its cost.

The invention aims to provide a microbial fuel cell cathode assembly with improvements relating to one or more of current density generation, operating lifetime, oxygen transport to the cathodic catalyst, electrical capacity per unit mass and equilibrium potential.

SUMMARY OF THE INVENTION

According to a first aspect of the present invention there is provided a microbial fuel cell cathode assembly comprising a catalyst and an electrically conductive catholyte wicking member having a catalyst contacting surface in contact with the catalyst, an electrical contact region for contacting an electrical connector, and a catholyte supply region for receiving catholyte from a catholyte supply, wherein the electrically conductive catholyte wicking member is operable to wick received catholyte from the catholyte supply region to form a film of catholyte on a part of the surface of the catalyst such that a part of the surface of the catalyst is in contact with the catholyte and a part of the surface of the catalyst is in contact with a gas pathway arranged to supply oxygen to the catalyst.

In use, separate parts of the surface of the catalyst will therefore be in contact with the gas pathway and the film of catholyte respectively, thereby providing the catalyst with a direct supply of both catholyte and oxygen. In contrast with an immersed cathode, the part of the surface of the catalyst is in contact with the gas pathway, either directly or perhaps through a very thin layer of water which is formed by the reduction of oxygen in use and which provides only a minimal restriction on the supply of oxygen to the cathode. Accordingly, diffusion of oxygen to the surface of the catalyst is much better than would the case with an immersed cathode. The provision of a film of catholyte on a part of the surface of the catalyst provides better communication with the catholyte than in a standard air facing cathode.

As the catholyte wicking member is electrically conductive, the electrical contact region is in electrical communication with the catalyst and so the catholyte wicking member facilitates both the provision of an electrical connection to the catalyst to form a circuit with an anodic zone and the supply of catholyte to the catalyst.

Preferably, the cathode assembly is adapted to enable catholyte to drain from the catalyst. Thus, fresh catholyte can be supplied to the catalyst and spent catholyte drained from the catalyst, preferably on a continuous basis. This reduces or avoids the accumulation of salt precipitate in or on the electrically conductive catholyte wicking member. The cathode assembly may comprise a drain, such as an aperture, or conduit through which catholyte can drain. Catholyte may drip from the cathode assembly in use. The drain may comprise a further wicking member. Preferably, the catalyst contacting surface is other than horizontal, to facilitate draining of catholyte from the catalyst contacting surface. For example, the catalyst contacting surface may be generally vertical.

The film of catholyte may be maintained on only a part of the catalyst by appropriate selection of the electrically conductive catholyte wicking member and the catalyst, and also by an appropriate adaptation to enable catholyte to drain from the catalyst at a suitable rate.

The gas pathway supplies oxygen to the catalyst in use. The gas pathway preferably comprises a gas space in contact with part of the surface of the catalyst. The use of a gas space in contact with part of the surface of the catalyst facilitates diffusion of oxygen to the catalyst. Preferably, the part of the surface of the catalyst which is in contact with the gas space is in direct contact with the gas space. By "direct contact with the gas space" we include the possibility that the part of the catalyst surface in direct contact with the gas space has a thin layer of water formed thereon in use from the reduction of oxygen.

Preferably, the catalyst comprises a plurality of catalytic granules in contact with the catalyst contacting surface and the electrically conductive catholyte wicking member, wherein at least some of the catalytic granules, and preferably the majority or all of the catalytic granules, have a surface portion which is in direct contact with the gas pathway (e.g. gas space) in use and a surface portion which is in direct contact with the catholyte film. A proportion of the catalytic granules should preferably also have a surface portion which is in direct contact with the wicking member.

The catholyte wicking member is preferably hydrophilic. The catholyte solvent may comprise both water and a co-solvent, such as ethanol, which reduces the surface tension of the catholyte. This increases the liquid contact surface between a granule and a film of catholyte and facilitates penetration of the mass of catalytic granules by the catholyte. Preferably, catholyte is supplied directly to the electrically conductive catholyte wicking member from a catholyte supply (such as a reservoir) in use.

Preferably, the gas space is exposed directly to a supply of oxygen, such as the air adjacent to the fuel cell. The gas pathway may be defined, at least in part, by a foramenous member, such as a grid, having apertures which extend directly through the foramenous member. The cross-section of the apertures is typically selected so that the catalytic granules cannot pass through the apertures. Accordingly, where the catalyst comprises catalytic granules, the foramenous member may retain the catalytic granules. Preferably, the gas pathway comprises apertures in a foramenous member and a gas space which is in communication with the apertures through the foramenous member and which surrounds the catalytic granules.

The use of a foramenous member, such as a grid, having apertures which extend directly through the foramenous member to define at least part of a gas pathway, rather than a microporous layer having a convoluted path for oxygen diffusion, such as a layer of microporous PTFE, facilitates rapid mass transfer of oxygen into the air space. Preferably, the supply of oxygen to the catalytic granules is not mass transport limited. Preferably, the foramenous member is electrically conductive and in contact with the electrically conductive catholyte wicking member at least one location where they are not spaced apart by the catalyst.

Preferably, the fuel cell cathode assembly is arranged so that the catholyte wicking member and the foramenous member exert compressive forces on the catalytic granules. This can retain the catalytic granules in place, where relevant. Furthermore, the compressive forces have the effect of improving the contact area between the catholyte wicking member and the catalytic granules, thereby reducing the electrical resistance between the catholyte wicking member and the catalytic granules. Preferably, the catholyte wicking member is sufficiently soft to deform (whether plastically or elastically) in contact with the catalytic granules. Preferably, the catalytic granules are sufficiently soft to deform (whether plastically or elastically) in contact with the catholyte wicking member.

The catalytic granules may be granules consisting of catalyst. The catalytic granules may be granules comprising catalyst. The catalytic granules preferably comprise a conductive substrate and catalyst. The catalyst may be adhered to the surface of the conductive substrate, impregnated into the conductive substrate, absorbed into the conductive substrate and/or adsorbed into the conductive substrate. The catalyst may comprise or consist of a metallo-organic compound.

The conductive substrate is preferably gas permeable. The conductive substrate is preferably permeable to the catholyte. These features provide a higher surface area for catalysis to occur than would be the case with a non-porous conductive substrate.

The conductive substrate may be graphite. Preferably, the conductive substrate is activated carbon. Preferably, the conductive substrate is sufficiently soft to deform due to the compressive forces exerted by the catholyte wicking member and the foramenous member.

Preferably, the cathode assembly comprises an ion-exchange membrane and at least a portion of the catholyte wicking member is located intermediate the ion-exchange membrane and the catalyst (e.g. catalytic granules). The catholyte wicking member may directly contact the ion-exchange membrane. However, a catholyte-permeable spacer is preferably provided intermediate the catholyte wicking member and the ion-exchange member. The catholyte-permeable spacer is typically conductive. The catholyte-permeable spacer is preferably porous to maximise its surface area. The spacer typically increases the overall electric capacity of microbial fuel cells including the cathode assembly. The catholyte wicking member should preferably be in direct electrical contact with the conductive spacer. Typically, the ion-exchange membrane, catholyte-permeable spacer and catholyte wicking member are formed as three successive layers. The ion-exchange membrane may be formed as a layer on the spacer.

Preferably, the wicking member is flexible and supported by a rigid member. The rigid member may be the spacer. Accordingly, the spacer is preferably rigid. The spacer may be made from a porous carbon material.

Preferably, the cross-sectional area of the catalyst contacting surface is greater than (preferably at least 3 times greater than and more preferably at least 8 times greater than) the cross-sectional area of the ion-exchange membrane. This maximises the catalytic surface area for a given amount of ion-exchange membrane. This can be important as ion-exchange membrane can be costly.

The catholyte supply region of the wicking member may be arranged to extend into a reservoir of catholyte. The catholyte supply region may comprise an elongate protrusion which extends from the region of the wicking member which supports the catalyst contacting surface.

The electrical contact region is preferably in contact with an electrical connector, which is typically metallic, for the formation of an electrical circuit with an anodic zone. The wicking member may comprise a protrusion and at least 50% of the width of the protrusion may be in electrical contact with an electrical connector. This facilitates the provision of a low resistance electrical contact. Alternatively, an electrical connector in the form of a pin may contact the electrical contact region.

The wicking member may comprise a plurality of conductive wicking member portions in electrical and liquid communication with each other.

Preferably, the wicking member is made from a hydrophilic conductive carbon-based material. The wicking member may comprise carbon cloth. The wicking member may comprise a sheet of carbon cloth.

The electrically conductive catholyte wicking member typically has a resistance of less than 10 Ohm, and preferably less than 1 Ohm, between two points separated by 10 cm.

The invention extends in a second aspect to a microbial fuel cell comprising a microbial fuel cell cathode assembly according to the first aspect of the present invention, a catholyte supply (such as a catholyte reservoir) in liquid communication with the electrically conductive catholyte wicking member for the transport of catholyte to the catalyst, and a cathodic electrical connection in electrical communication with the electrically conductive catholyte wicking member for the transport of catholyte to the catalyst.

Preferably, the catalyst contacting surface is generally planar and arranged other than horizontally so that catholyte can drain from the catalyst contacting surface. The catalyst contacting surface is preferably generally vertical.

A third aspect of the present invention provides a method of operating a microbial fuel cell according to the second aspect of the invention in which the catholyte supplied to the electrically conductive catholyte wicking member is changed to change the catholyte at the catalyst contacting surface.

The electrically conductive catholyte wicking member may comprise a catholyte supply region located within a first catholyte supply reservoir, wherein the catholyte within the first catholyte supply reservoir is changed, or the wicking member is introduced to a second catholyte supply reservoir containing a different catholyte in order to change the catholyte supplied to the electrically conductive catholyte wicking member.

The catholyte supplied to the electrically conductive catholyte wicking member may be changed to catholyte with a different pH, for example a lower pH. The pH may be varied between an operating pH (e.g. around 3) and a non-operating pH which is more favourable for the growth of microorganisms (e.g. around 7) within the anodic region of the microbial fuel cell.

The catholyte supplied to the electrically conductive catholyte wicking member is preferably changed while the microbial fuel cell is in a closed circuit mode, in which the anode and cathode are typically connected via an external resistor.

According to a fourth aspect of the present invention there is provided a method of supplying oxygen and catholyte to a catalyst comprising catalytic granules in a microbial fuel cell cathodic assembly comprising (i) bringing the catalytic granules into contact with a catalyst contacting surface of an electrically conductive catholyte wicking member having a catalyst contacting surface, an electrical contact region for contacting an electrical connector and a catholyte supply region for receiving catholyte from a catholyte supply; and (ii) wicking catholyte to the catalyst contacting surface through the electrically conductive catholyte wicking member to form a film of catholyte on a part of the surfaces of the catalytic granules such that a part of the surfaces of the catalytic granules is in contact with the film of catholyte and a part of the surfaces of the catalytic granules is in contact with a gas pathway arranged to supply oxygen to the catalyst.

Preferably, at least some of the catalytic granules have a surface portion in contact with the film of catholyte and a surface portion in contact with a gas pathway arranged to supply oxygen to the catalyst.

Thus, at least some of the catalytic granules will have a surface portion in contact with the film of catholyte and a surface portion in contact with a gas pathway arranged to supply oxygen to the catalyst.

Preferably, the catalyst contacting region is arranged so that spent catholyte drains from the catalyst contacting region. Preferably, the microbial fuel cell cathodic assembly corresponds to the microbial fuel cell cathodic assembly of the first aspect of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
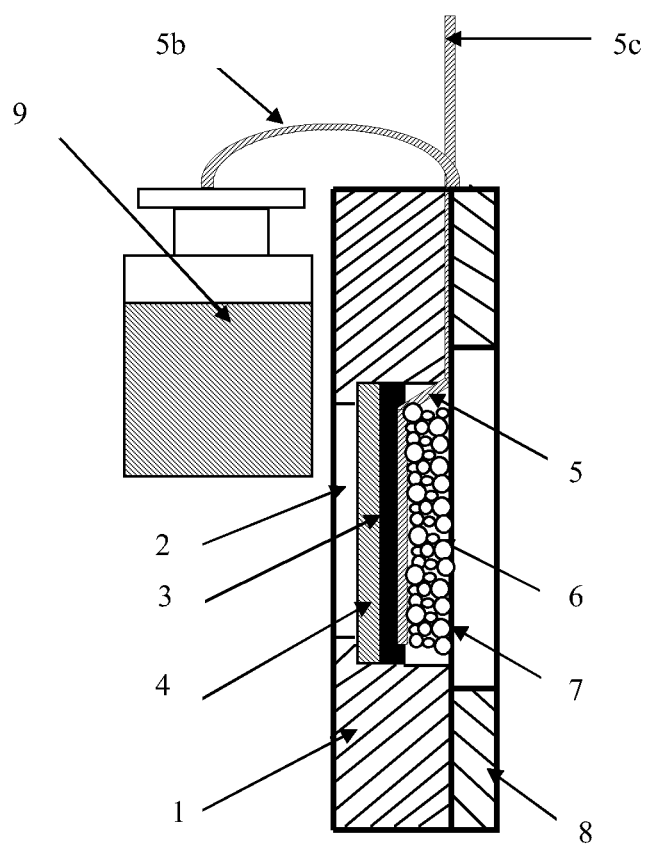
FIG. 1 is a schematic diagram of a section through a cathode assembly according to the present invention.
Figure 2:
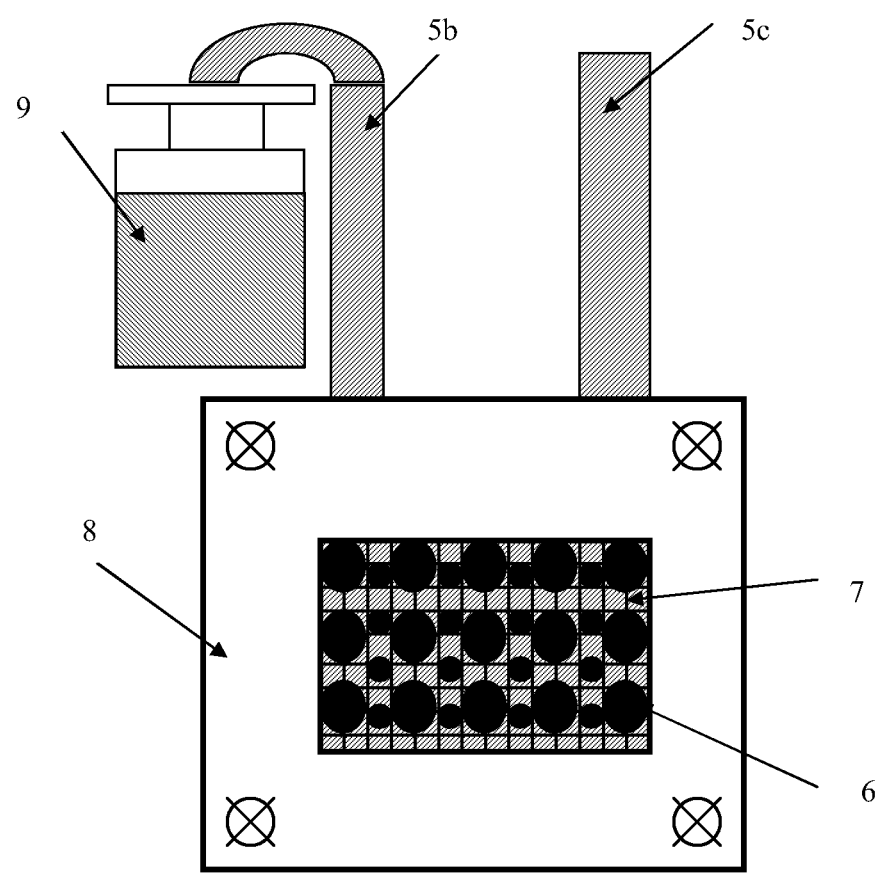
FIG. 2 is a schematic plan view of the cathode assembly of FIG. 1.
Figure 3:
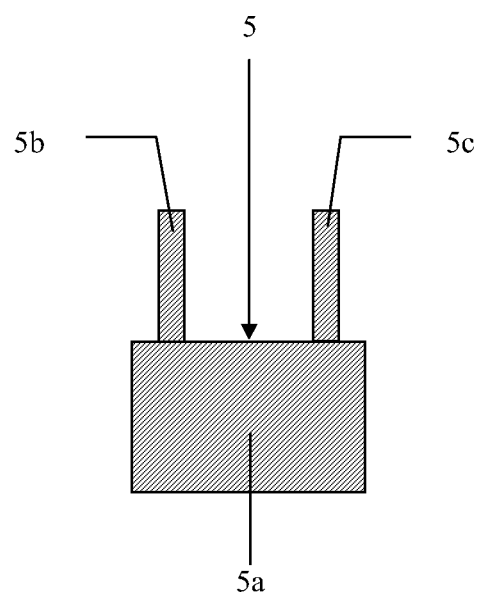
FIG. 3 is a schematic diagram of carbon cloth, functioning as the electrically conductive catholyte wicking member, in the cathode assembly of FIG. 1.

FIGS. 1 to 3 illustrate a cathode assembly for a microbial fuel cell, in which the cathodic reaction is based on the reduction of oxygen by the following reaction:

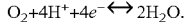

$O_2 + 4H^+ + 4e^- \leftrightarrow 2H_2O$.

With reference to FIGS. 1 and 2, the cathode assembly comprises a holder 1 which comprises a circular aperture 2 therethrough. The aperture has a stepped diameter cross-section, with a narrower diameter cross-section towards the anodic region and a larger diameter cross-section towards external air.

An ion permeable membrane 4 divides the anodic zone from the cathodic zone and is supported by and formed on a rigid porous separator 3 which is conductive and catholyte-permeable. The opposing face of the porous rigid separator is covered by a layer of carbon cloth 5 which functions as the electrically conductive catholyte wicking member.

The layer of carbon cloth is shown in plan view in FIG. 3. The carbon cloth is cut as a single piece from a sheet of carbon cloth and comprises three key areas, a catalyst contacting surface 5a in contact with catalyst granules 6, a catholyte inlet area 5b (functioning as the catholyte supply region), and an electric output area 5c (functioning as the electrical contact region) to which an electrical connection, such as a metal clip, is attached. The catalyst contacting surface serves as a collector of electric charge. The catalyst contacting surface has a cross-sectional area of approximately 10 times the cross-sectional area of the ion exchange membrane. (By cross-sectional area we refer to the area of a cross-section parallel to the catalyst contacting surface and ion exchange membrane).

The porous rigid separator has several functions. Firstly, by spacing apart the carbon cloth and the ion exchange membrane, it functions to increase the electric capacity of the cathode assembly. Secondly, it provides rigidity for the cathode assembly and a support for the carbon cloth.

Furthermore, the porous rigid separator functions along with a rigid grid 7 to maintain a compressive force on the catalyst granules, increasing the contact surface area between the catalyst granules and the carbon cloth and reducing resistance.

The rigid grid functions as a foramenous member and includes a plurality of apertures therethrough. A gas pathway is defined by the air space (functioning as the gas space) around the catalyst granules, between the grid and the carbon cloth, and also by the apertures through the grid. Oxygen diffuses from the surrounding air to the catalyst granules by the gas pathway.

The catalyst granules have a conductive substrate of activated carbon, coated with a catalytic metallo-organic compound, such as iron(II)-phthalocyanine. Metallo-organic compounds are typically less expensive than a traditional cathodic catalyst, such as platinum. Activated carbon is porous, increasing the effective surface area of the granules. The granules of activated carbon are pressed against the catalyst contacting surface of the carbon cloth by a grid 7, functioning as the foramenous member and located on the internal side of a lid 8. As both activated carbon and carbon cloth are soft, the tissue and activated carbon granules each deform slightly under the compressive forces, increasing the contact surface area and reducing the resistance of the electrical junction therebetween.

Catholyte is stored in an external reservoir 9 and wicked to the catalytic region in use, via the catholyte inlet area of the carbon cloth. Catholyte, which typically has physico-chemical parameters which are similar to those of the anodic electrolyte, is transported to the catalyst contacting surface by capillary action and thus into the catalyst. Further catholyte is supplied as solvent evaporates. The rate of wicking is selected to maintain a film of catholyte on part of the surface of the catalyst granules, but not to fully immerse the catalyst granules so that no part of the surface of the catalyst granules is in contact with the air space. Thus, at least some of the catalyst granules are in constant liquid communication with both the catholyte and the air space. Catalyst granules which are closest to the carbon cloth may be generally immersed serve both to generate charge and transmit ions via the film of catholyte. Catalyst granules half way between the carbon cloth and the foramenous member or near the foramenous member may be covered partially with catholyte and so the catholyte film will typically extend a significant proportion of the way into the layers of catalyst granules which form the catholyte. Catalyst granules nearest the foramenous member will be predominantly or entirely in contact with the air space, perhaps through a thin film of water formed as a result of the reduction of oxygen in use.

Accordingly, a cathode assembly has been provided in which the evaporation of water is slower than would be the case for an air facing cathode, but where the mass transport of oxygen to the catalyst is faster than would be the case for an immersed cathode. The use of wicking to automatically supply catholyte to the catalyst contacting area avoids wasting generated power.

The cathode assembly is typically provided with the grid, and indeed each of the ion exchange membrane, separator, carbon cloth and catalyst layers, in a vertical orientation so that excess catholyte drains from the bottom of the lid. The lid may have a channel which functions as a drain. Thus, catholyte is supplied by wicking through the carbon cloth and spent catholyte drains away from the catalyst. The volume of the catholyte within the catholyte film, and the proportion of the surface area of the catalytic granules which is in contact with the catholyte film, can be varied by altering the rate of catholyte wicking and adjusting the drain.

The catholyte can be changed in use by putting the microbial fuel cell into a closed circuit mode, with a resistor between the anodic and cathodic electrical connections, and then simply introducing the catholyte inlet area into a reservoir of a different catholyte, for example a catholyte with a lower pH. This would not be practical with an immersed cathode. Thus, a microbial fuel cell can be operated in current generating mode at a relatively low pH (e.g. around 3) but periodically returned to a higher pH (e.g. around 7), for example in open circuit mode, which pH is more favourable to the microorganisms within the anodic zone which will be affected to at least some extent by the pH in the cathodic zone. Other liquids, such as pure water, may also be introduced to the catholyte inlet area for a period of time when the microbial fuel cell is in open circuit mode, for other purposes, such as removing any precipitated salts.

A further benefit of the arrangement described above is that, during long term current generation, the flow of catholyte removes hydrogen peroxide from around the catalyst, thereby enhancing the kinetics of cathodic reaction.

Experiment 1

An experiment was carried out to determine the influence of the catholyte pH on the current density. The experimental apparatus comprised a simple electrochemical cell in the form of a parallelepiped. The interior of the electrochemical cell contained a planar anodic electrode immersed in anodic electrolyte. The cathode assembly to be tested corresponded to that cathode assembly discussed above and illustrated with reference to FIGS. 1 to 3 and was attached to the side plane of the electrochemical cell with the ion exchange membrane in contact with anodic electrolyte. A saturated Ag/AgCl reference electrode was placed in the anodic zone, in contact with the ion exchange membrane which separated the anodic zone from the cathodic zone. Accordingly, the distance between the cathodic separator and the reference electrode was minimal and equal to the thickness of the ion exchange membrane.

Experiments were carried out using 0.05M phosphate buffer as both anodic zone electrolyte and catholyte. In a first experiment, the catholyte pH was 5.5. In a second experiment, the catholyte pH was 3.3, obtained by titrating 0.05M phosphate buffer was concentrated hydrochloric acid. In each experiment, the pH within the anodic zone was 5.0.

Figure 4:
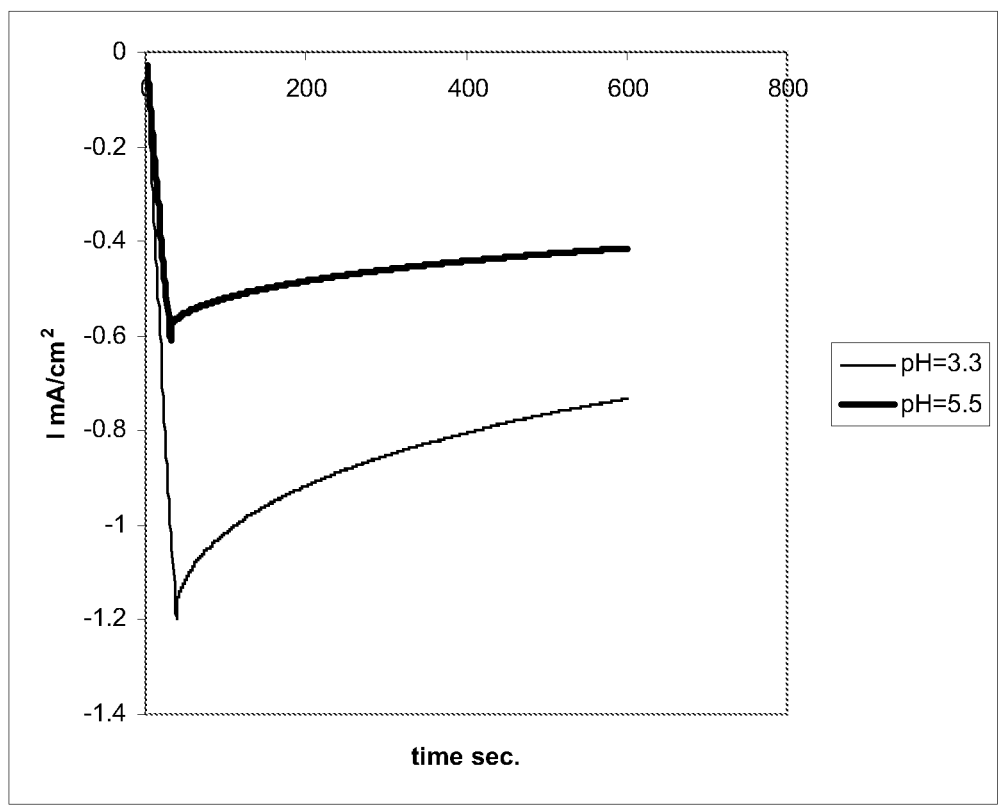
FIG. 4 is a graph of the variation with time of the current density of microbial fuel cells according to the present invention with different values of catholyte pH.

The system was initially operated in open circuit mode until the cathodic potential had reached equilibrium. Then, by means of a potentiostat, the cathodic potential was adjusted to the final value of 0 mV with respect to the reference electrode, with a scanning rate of 10 mV per second. The cathodic potential was then kept equal to the reference electrode potential. The output current density was observed during this procedure and illustrated in FIG. 4. These results demonstrate that, with a catholyte pH of 3.3, it is possible to obtain a maximum current density of not less that 1.2 mA/cm$^2$. The same results were found when the experiment was repeated with the same apparatus one month later.

Example 2

Figure 5:
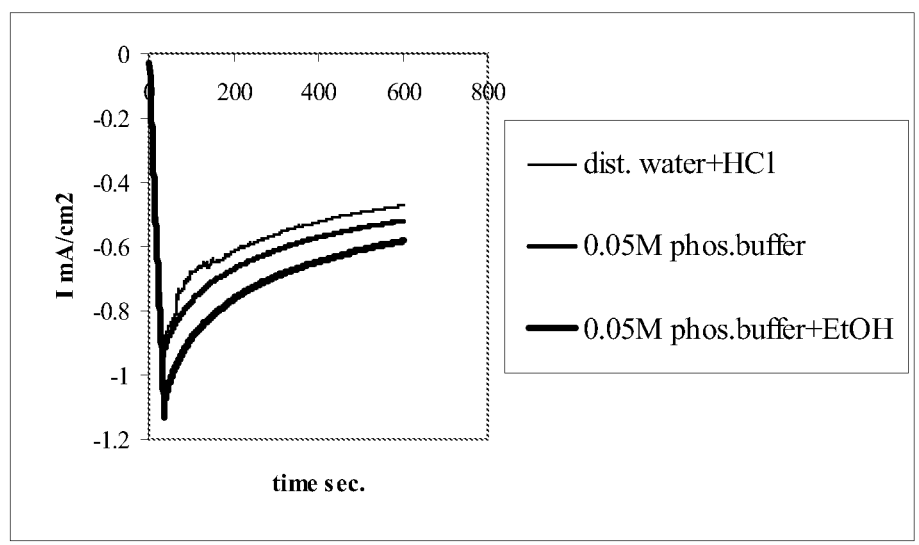
FIG. 5 is a graph of the variation with time of the current density of microbial fuel cells according to the present invention with different catholyte compositions.

A second experiment was carried out to determine the influence of the composition of catholyte on the current density. The second experiment was carried out using the same experimental apparatus and the same protocol as described above in relation to Example 1. Three catholyte compositions were tested, each of which had a pH of 4.5. The first catholyte was distilled water mixed with HCl. The second catholyte was 0.05M-phosphate buffer. The third catholyte was 0.05M-phosphate buffer which contained 20% by volume of ethanol. In each case, the pH of the anodic zone was 5.0. FIG. 5 shows the variation in the current density with time with each catholyte composition. Comparison with the results shown in FIG. 4 indicates that the presence of ethanol in the catholyte improves current density. This can be explained by the fact that ethanol lowers the liquid surface tension.

In these experiments, the rate of diffusion of oxygen to the catalyst was found to be around 10,000 times greater than the rate of diffusion through the catalyte in a typical immersed cathode assembly.

Further modifications and variations may be made within the scope of the invention herein disclosed.

The invention claimed is:

1. A microbial fuel cell cathode assembly comprising: a multilayer conductive porous substrate with macroporous and microporous structures inside coated by a catalyst, an electrically conductive catholyte wicking member, a catholyte-permeable rigid spacer with an ion-exchange membrane, an external catholyte supply reservoir, and a netlike foraminous member with a system of apertures; wherein the wicking member contains no catalyst and is operable to wick the catalyst by catholyte received from a supply reservoir to form a film of the catholyte on a catalyst containing surface of the multilayer conductive porous substrate, wherein the spacer together with the foraminous member exert compressive forces on the multilayer conductive porous substrate and the catholyte wicking member, and wherein the microporous structure is defined by an internal porous structure of granules while the macroporous structure is defined by a space between individual granules which are pressed to each other by compressive forces thus determining gas pathways inside the multilayer conductive porous substrate with the catalyst.

2. The microbial fuel cell cathode assembly according to claim 1, wherein the conductive substrate is a compressed plurality of granules of activated carbon.

3. The microbial fuel cell cathode assembly according to claim 1, wherein a catholyte solvent comprises both water and a co-solvent which reduces surface tension of the catholyte.

4. The microbial fuel cell cathode assembly according to claim 1, wherein a catholyte-permeable spacer is provided between the catholyte wicking member and the ion-exchange membrane.

5. The microbial fuel cell cathode assembly according to claim 4, wherein the ion-exchange membrane, the catholyte-permeable spacer, and the catholyte wicking member are formed as three successive layers.

6. The microbial fuel cell cathode assembly according to claim 1, wherein an upper part of the wicking member comprises sections of two types, the first type of section being used for in electrical communication and the second type of section being used for liquid communication.

7. The microbial fuel cell cathode assembly according to claim 6, wherein a portion of the upper part of the wicking member serving for electric communication is in contact with an electrical connector for formation of an electrical circuit with the anodic zone.

8. The microbial fuel cell cathode assembly according to claim 1, wherein the catholyte wicking member comprises carbon cloth.

9. The microbial fuel cell cathode assembly according to claim 1, wherein the catholyte supply reservoir has direct liquid contact neither with an anodic zone nor with an electrolyte membrane which separates the anodic zone and a cathodic zone, and wherein the catholyte supply reservoir is located at some distance above a zone of electrochemical reaction at the catalyst.

10. The microbial fuel cell cathode assembly according to claim 1, wherein a portion of the upper part of wicking member serving for liquid communication is immersed in the catholyte supply reservoir, while a lower part of the wicking member is in contact with the catalyst.

11. The microbial fuel cell cathode assembly according to claim 9, wherein a portion of the upper part of wicking member serving for liquid communication is immersed in the catholyte supply reservoir, while a lower part of the wicking member is in contact with the catalyst.

12. The microbial fuel cell cathode assembly according to claim 9, wherein different levels of location of the catholyte supply reservoir and the catalyst enable continuous supply of the catalyst with a new portion of the catholyte through the wicking member by means of capillary effect enhanced by gravity.

13. The microbial fuel cell cathode assembly according to claim 10, wherein different levels of location of the catholyte supply reservoir and the catalyst enable continuous supply of the catalyst with a new portion of the catholyte through the wicking member by means of capillary effect enhanced by gravity.

14. The microbial fuel cell cathode assembly according to claim 11, wherein different levels of location of the catholyte supply reservoir and the catalyst enable continuous supply of the catalyst with a new portion of the catholyte through the wicking member by means of capillary effect enhanced by gravity.

15. The microbial fuel cell cathode assembly according to claim 1, wherein a size of the apertures in the foraminous member is such that compressed granules cannot pass there through, and wherein the size of the apertures in the foraminous member determines a size of the gas pathways to supply the reacting zone with air or oxygen.

16. The microbial fuel cell cathode assembly according to claim 2, wherein a size of the apertures in the foraminous member is such that compressed granules cannot pass there through, and wherein the size of the apertures in the foraminous member determines a size of the gas pathways to supply the reacting zone with air or oxygen.

17. The microbial fuel cell cathode assembly according to claim 4, wherein the ion-exchange membrane on a surface of the spacer is faced to an anodic zone.

18. The microbial fuel cell cathode assembly according to claim 1, wherein the catalyst comprises a coordinated compound.

* * * * *